(12) United States Patent
Klein

(10) Patent No.: US 7,568,647 B2
(45) Date of Patent: Aug. 4, 2009

(54) LINE GUIDE FOR A REEL UNIT AND A REEL UNIT INCLUDING SUCH A LINE GUIDE

(76) Inventor: Helmut Klein, Egger Strasse 47, Metten (DE) 94526

( * ) Notice: Subject to any disclaimer, the term of this patent is extended or adjusted under 35 U.S.C. 154(b) by 136 days.

(21) Appl. No.: 11/794,173

(22) PCT Filed: Dec. 12, 2005

(86) PCT No.: PCT/DE2005/002304

§ 371 (c)(1),
(2), (4) Date: Jun. 26, 2007

(87) PCT Pub. No.: WO2006/069561

PCT Pub. Date: Jul. 6, 2006

(65) Prior Publication Data

US 2008/0128539 A1   Jun. 5, 2008

(30) Foreign Application Priority Data

Dec. 27, 2004   (DE) .................. 10 2004 062 886

(51) Int. Cl.
*A01K 89/01* (2006.01)
(52) U.S. Cl. .................. 242/279; 242/277; 242/278
(58) Field of Classification Search ................ 254/278, 254/279, 277
See application file for complete search history.

(56) References Cited

U.S. PATENT DOCUMENTS

| 1,001,857 | A |   | 8/1911  | Jernstedt |
|-----------|---|---|---------|-----------|
| 2,331,919 | A |   | 10/1943 | Maynes    |
| 3,913,859 | A |   | 10/1975 | Miyamae et al. |
| 4,974,792 | A | * | 12/1990 | Miyazaki .................... 242/279 |
| 5,131,596 | A | * | 7/1992  | Sato ............................ 242/279 |
| 5,308,019 | A | * | 5/1994  | Karlsson ..................... 242/279 |
| 5,503,345 | A | * | 4/1996  | Kaneko ....................... 242/279 |
| 5,775,614 | A | * | 7/1998  | Yamaguchi ................. 242/261 |
| 5,996,919 | A | * | 12/1999 | Murayama et al. .......... 242/279 |
| 6,045,075 | A | * | 4/2000  | Iwabuchi et al. ............ 242/279 |
| 6,315,228 | B1|   | 11/2001 | Sato |
| 2007/0114316 | A1 | * | 5/2007 | Klein ......................... 242/278 |

FOREIGN PATENT DOCUMENTS

WO   WO 00/78133   12/2000

* cited by examiner

*Primary Examiner*—Emmanuel M Marcelo
(74) *Attorney, Agent, or Firm*—Hoffman, Wasson & Gitler

(57) ABSTRACT

A line guide for a reel unit for winding a fishing line onto or unwinding it from a spool is provided on the housing of the reel unit and comprises a carriage guide and a carriage element with at least one line eye. The carriage guide can be functionally linked with the gear mechanism of the spool. Advantageously, the carriage guide is configured as a spindle-shaped pilot shaft and the carriage element is provided with an internally threaded guide channel for guiding on the spindle-shaped pilot shaft.

24 Claims, 5 Drawing Sheets

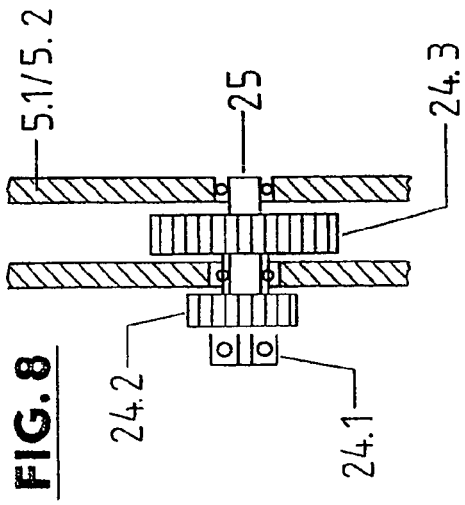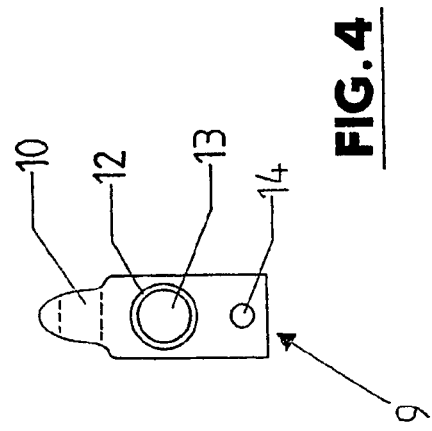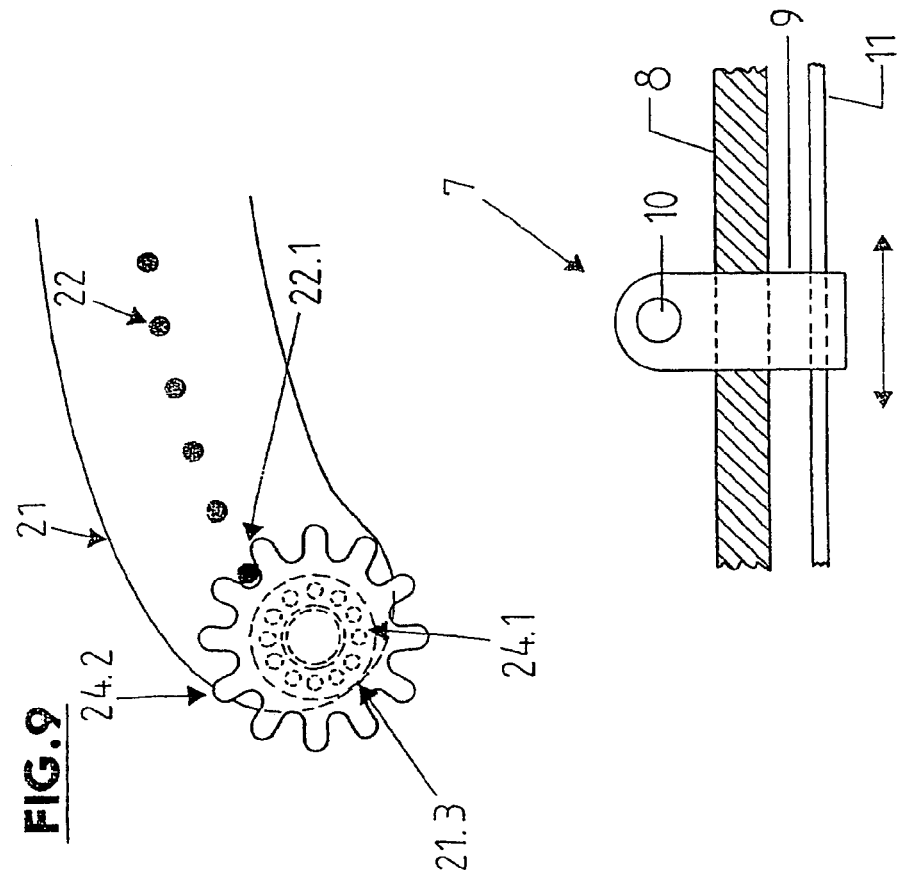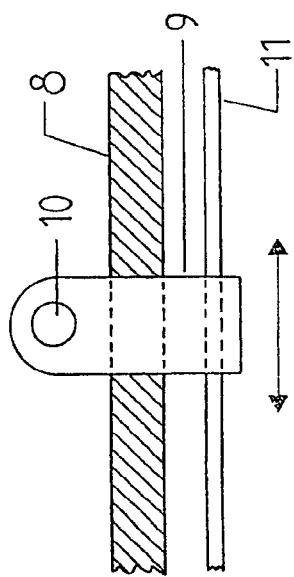

LINE GUIDE FOR A REEL UNIT AND A REEL UNIT INCLUDING SUCH A LINE GUIDE

The invention relates to a line guide for a reel unit for winding a fishing line on to, or unwinding, if from a spool.

For winding and unwinding fishing line, so-called reel units are known in the art, which can be fastened to a fishing rod and comprise, on a housing, a rotatable bearing-mounted reel or spool for the fishing line. In particular, reel units are also known in which the reel is provided on the fishing rod so that it can rotate on an axis, which is oriented perpendicular to a longitudinal axis of the plane enclosing the rod. Such reel units are known by those skilled in the art as "big game reels". The manual turning of the reel, especially of such a big game reel, is achieved by means of a crank that is provided on the side of the housing and that is functionally linked by means a driven gear unit, especially a reversing gear unit, with the spool. The gear unit or reversing gear unit is provided with a return stop, which can be manually released and when in non-released position enables turning of the spool for the purpose of reeling in the fishing line, but prevents the spool from turning in the opposite direction. A line guide always points forward.

Normally the reel unit is mounted upright, i.e. on top of the rod. The crank for manual actuation of the spool is located on the right side of the housing. This design was originally adopted from the United States, since many left-handers there hold the rod with the left hand and turn the crank with the right hand. For right-handers, who want to hold the rod with the right hand and turn the crank with the left hand, this design is unsuitable. With a reel mounted upright, the crank would have to be located on the left side of the housing. Therefore, different versions of the reel units are necessary for left-handers and right-handers. The same applies if the reel unit is to be mounted suspended, i.e. beneath the rod. In this case, different versions are likewise necessary for left-handers and right-handers. Due to the design of the line guide, it is not possible to use a version of the line guide intended for upright mounting of the reel for suspended mounting. Rather, modifications of the line guide or adaptation of the line guide are necessary in this case.

One disadvantage of known reel units with a line guide is, for example, that after repairing a broken fishing line, the line guide is generally not in the optimum or correct position for winding up the fishing line, i.e. for example it is axially offset in relation to the last winding of the line wound on the spool, so that proper unwinding of the line from the spool in several layers with close adjacent windings is no longer possible or possible only by completely unwinding and completely rewinding the fishing line after repairing the line. Such a line that is wound crosswise to the spool subjects the line guide to enormous lateral loads, which causes premature wear to the line.

It is an object of the invention is to present a line guide and a reel unit with such a line guide that eliminates this disadvantage and also, for example after repairing a broken fishing line, enables continued optimal winding and unwinding of the line in a simple manner.

SUMMARY OF THE INVENTION

In the line guide according to the invention, the carriage guide is configured as a spindle-shaped pilot shaft and the corresponding carriage element is provided with an internally geared guide channel with internal threads for guiding on the spindle-shaped pilot shaft. Advantageously, a gear mechanism that can be functionally linked with the reel subjects the spindle-shaped pilot shaft to an oscillating rotary movement, which when actuating the crank of a reel unit, moves the carriage element comprising a line eyelet periodically back and forth, parallel to the spool axis for winding and unwinding the line on the spool. The configuration of the line guide according to the invention thus enables the extremely even winding/unwinding of the line onto/from the spool or reel of a corresponding reel unit. The line guide according to the invention can be designed to be watertight and replaces a worm shaft, which is error-prone.

The line guide according to the invention is suitable also for reel units, in particular multiplier reels of all types, in particular also for such reel units for left-handers or right-handers.

BRIEF DESCRIPTION OF THE INVENTION

The invention is described in more detail below based on an exemplary embodiment with reference to the drawings, wherein:

FIG. 3 shows a simplified, top view of a line guide;

FIG. 4 shows a simplified, side view of the carriage element of the line guide;

FIG. 8 shows a side view of the gear element engaging in the pendulum plate and

FIG. 9 shows a simplified view of the gear element guided in the recess of the pendulum plate.

DETAILED DESCRIPTION OF THE INVENTION

Figure 1:
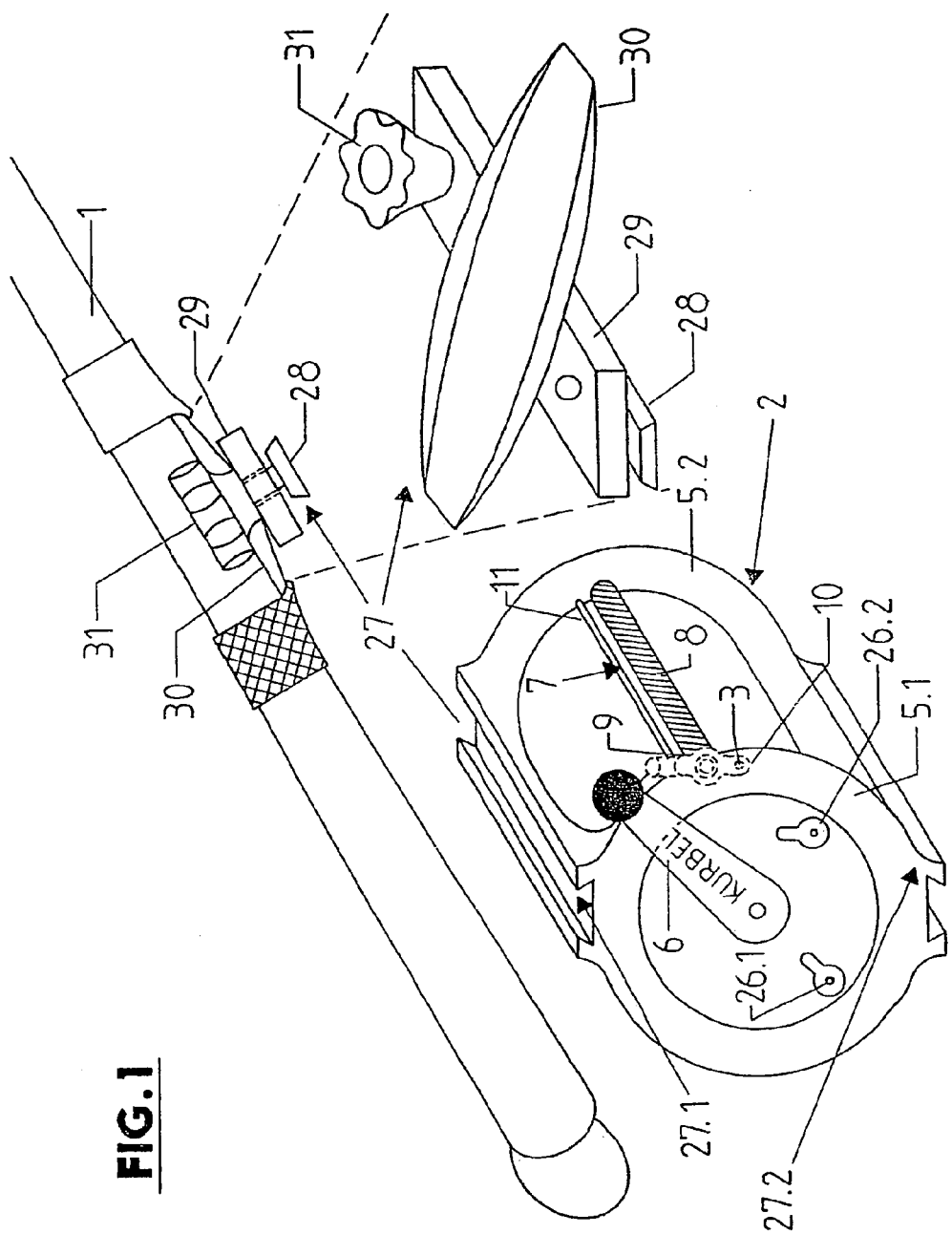
FIG. 1 shows a simplified, exploded view of a fishing rod together with a reel unit mounted on the fishing rod and corresponding mounting device.
Figure 2:
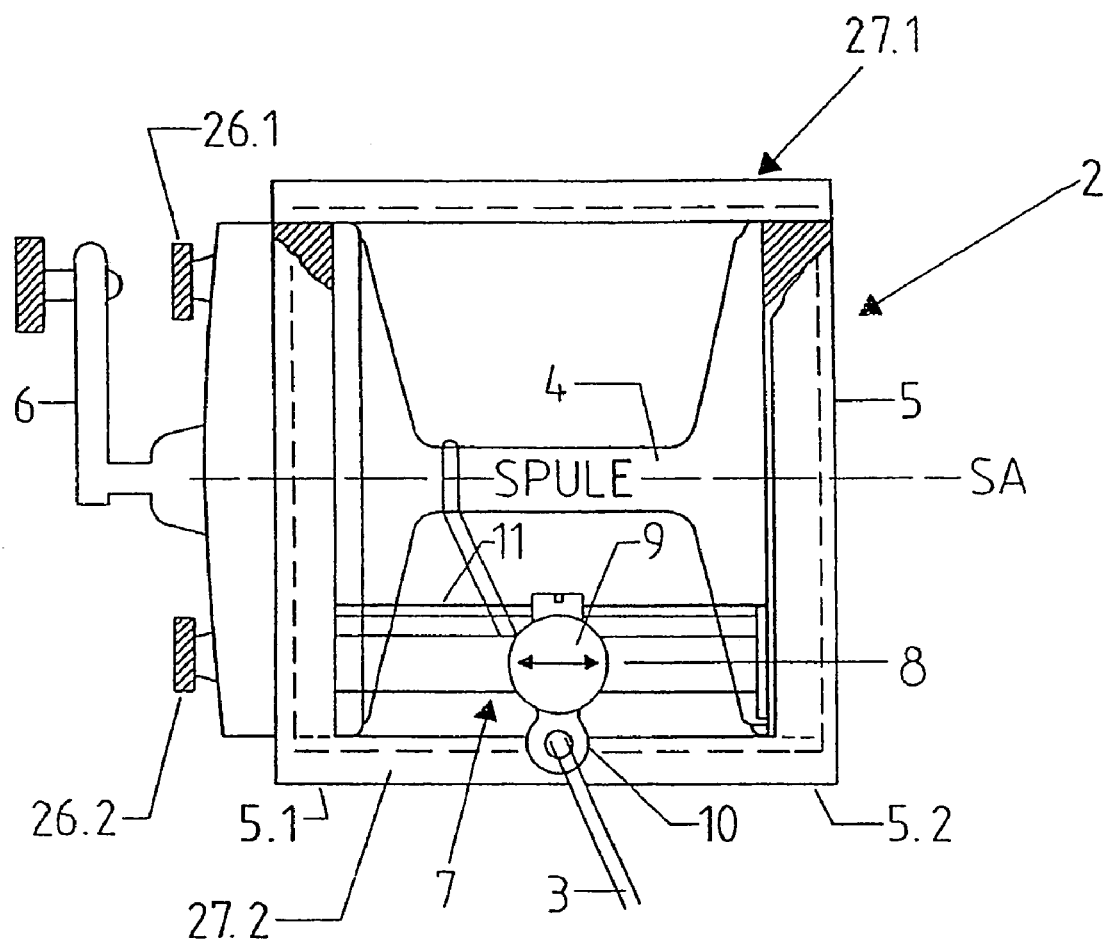
FIG. 2 shows a component view of the reel unit.

In the drawings, 1 designates a fishing rod, on which a mounting device 27 for mounting a winch or reel unit 2 is provided for manual winding and unwinding of the fishing line 3. In the view in FIG. 1, suspended mounting of the reel unit 2 on the fishing rod is provided for, i.e. the reel unit 2 is located on the underside of the fishing rod. Generally, the reel unit could also be mounted upright, i.e. on the top of the fishing rod.

The reel unit 2 consists in the known manner essentially of a spool 4, which is rotatably mounted on bearings on a spool axis between the two elements 5.1, 5.2 of a spool housing 5 for winding and unwinding the fishing line 3. The reel 4 can be actuated by means of a crank 6 on the outside of a housing section 5.1 of the reel housing 5 and by means of a non-depicted gear unit or reversing gear unit located in this housing section 5.1.

Between the two housing sections 5.1, 5.2, parallel to the spool axis SA and offset from the latter, a line guide 7 is provided, which comprises on a carriage guide 8 a carriage element 9 with a line eyelet 10, which together with the carriage 9 is moved back and forth with the rotary movement of the reel 4 along the carriage guide 8 for optimum winding of the fishing line 3. Furthermore, the carriage element 9 is linked with a guide rail 11, by means of which the distance between the line eyelet 10 and the spool axis SA is kept constant, thus preventing twisting of the carriage element 9 on the carriage guide 8.

The carriage guide 8 is designed, for example, as a threaded spindle with a large pitch and is guided in a guide channel 13, with internal threads 12, of the carriage element 9. Furthermore, the carriage element 9 comprises a bore hole 14 for guiding the guide rail 11. The longitudinal axes of the guide channel 13 and of the bore hole 14 extend perpendicular to the longitudinal axis of the line eyelet 10, and in a preferred embodiment, the longitudinal axes of the guide channel 13 and of the bore hole 14 lie in one plane.

In a preferred embodiment, the carriage guide or pilot shaft 8 configured as a threaded rod is clamped between the two housing sections 5.1, 5.2 and functionally linked by means of a pilot gear 15 provided on one end of the pilot shaft 8 with a spur gear 16. The spur gear 16 is provided, for example, in one of the two housing sections 5.1 and comprises several gear teeth 16.1 provided on the edge of the circular disk-shaped spur gear 16 for actuating the pilot gear 15.

In addition, the spur gear 16 comprises one first and second nearly rectangular recess 17.1, 17.2, in which one first and second bearing element 18.1, 18.2 of a pendulum plate 19 engage when mounted. Also, a bearing bore 20 is provided in the center of the spur gear 16 for rotatable mounting on the rotary axis or spool axis SA, thus driving the spindle-shaped pilot shaft 8 via the pilot gear 15, which for example is linked with the drive teeth 16.1 of the spur gear 16. For this purpose, the spur gear 16 executes pendulum-like, e.g. quarter-circular rotations on the spool axis, alternately clockwise and counterclockwise.

These pendulum-like alternating rotary movements are generated via the pendulum plate 19 and transmitted via the first and second bearing element 18.1, 18.2, which engage in the first and second recess 17.1, 17.2 of the spur gear, from the pendulum plate 19 to the spur gear 16. The first and second bearing element 18.1, 18.2 can be designed as conventional ball bearing elements. Especially the pendulum-like alternating rotary movements of the spindle-shaped pilot shaft 8 are calculated so that the carriage element 9 oscillates at an even speed between the one housing section 5.1 and the other housing section 5.2 of the spool 4. Furthermore, the alternation of the rotary movement from clockwise to counterclockwise and vice versa, i.e. the carriage element 9 reaching the left or right end of the spindle-shaped carriage guide 8 between the two housing sections 5.1, 5.2, results in a short standstill of the carriage element 9, which enables optimized winding and unwinding of the fishing line 3 especially in the edge area of the spool 4.

To generate such an oscillating movement, the pendulum plate 19 comprises a circular arc-shaped recess 21 within the base plate 19, with a depth t, a width b and a length l. In the recess 21 of the carriage guide, pilot pins 22 are arranged equidistant along a circular arc-shaped line. The pilot pins can be steel pins, for example, with a length exceeding the depth t of the recess 21 and can have varying diameters and be at varying distances from each other.

Figure 5:
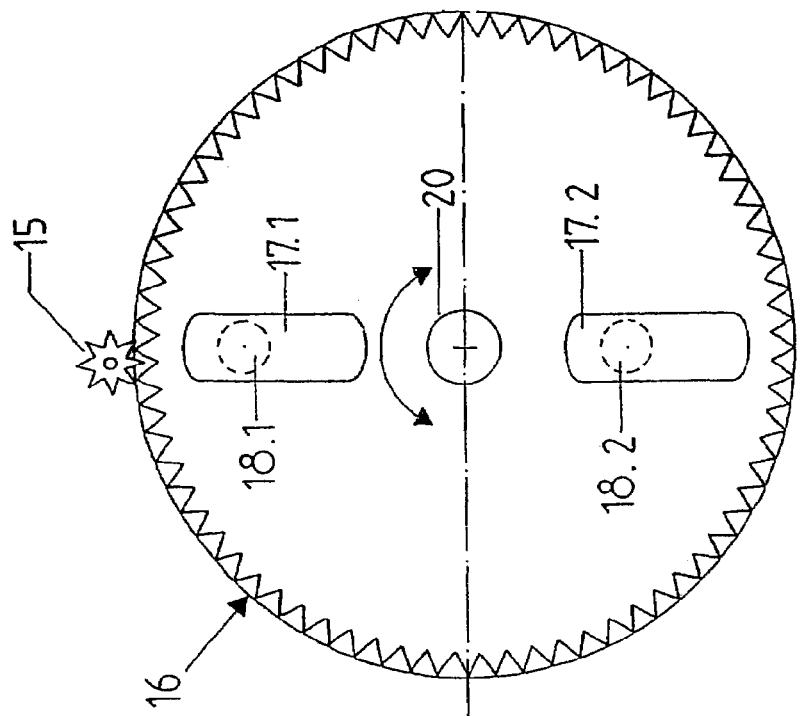
FIG. 5 shows a side view of the spur gear of the pendulum drive.
Figure 7:
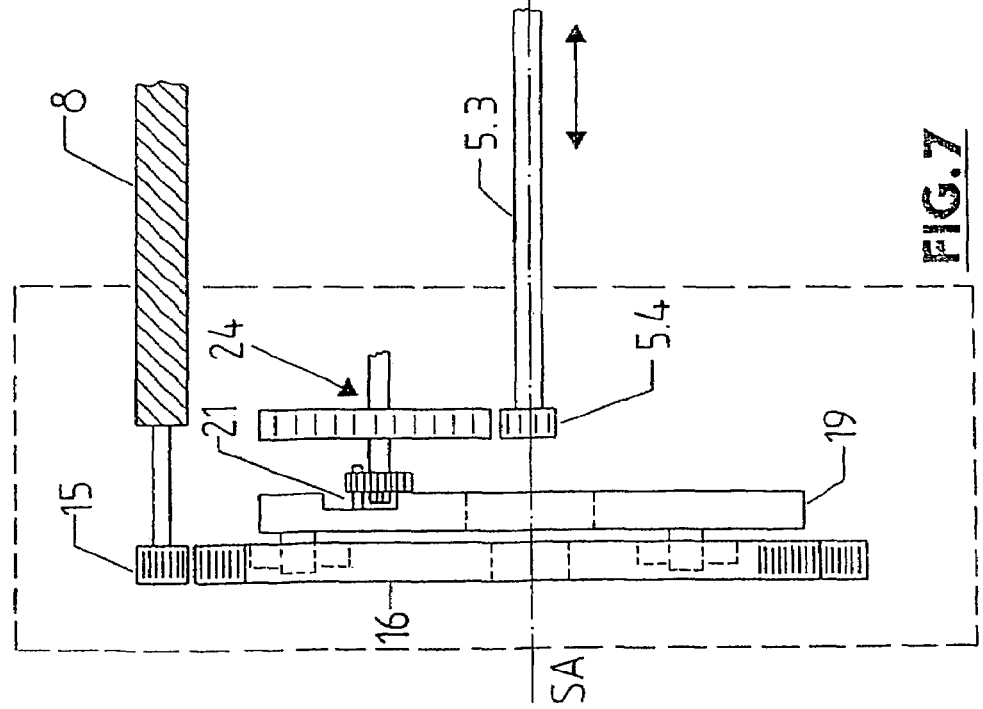
FIG. 7 shows a simplified side view of the individual components of the pendulum drive.
Figure 6:
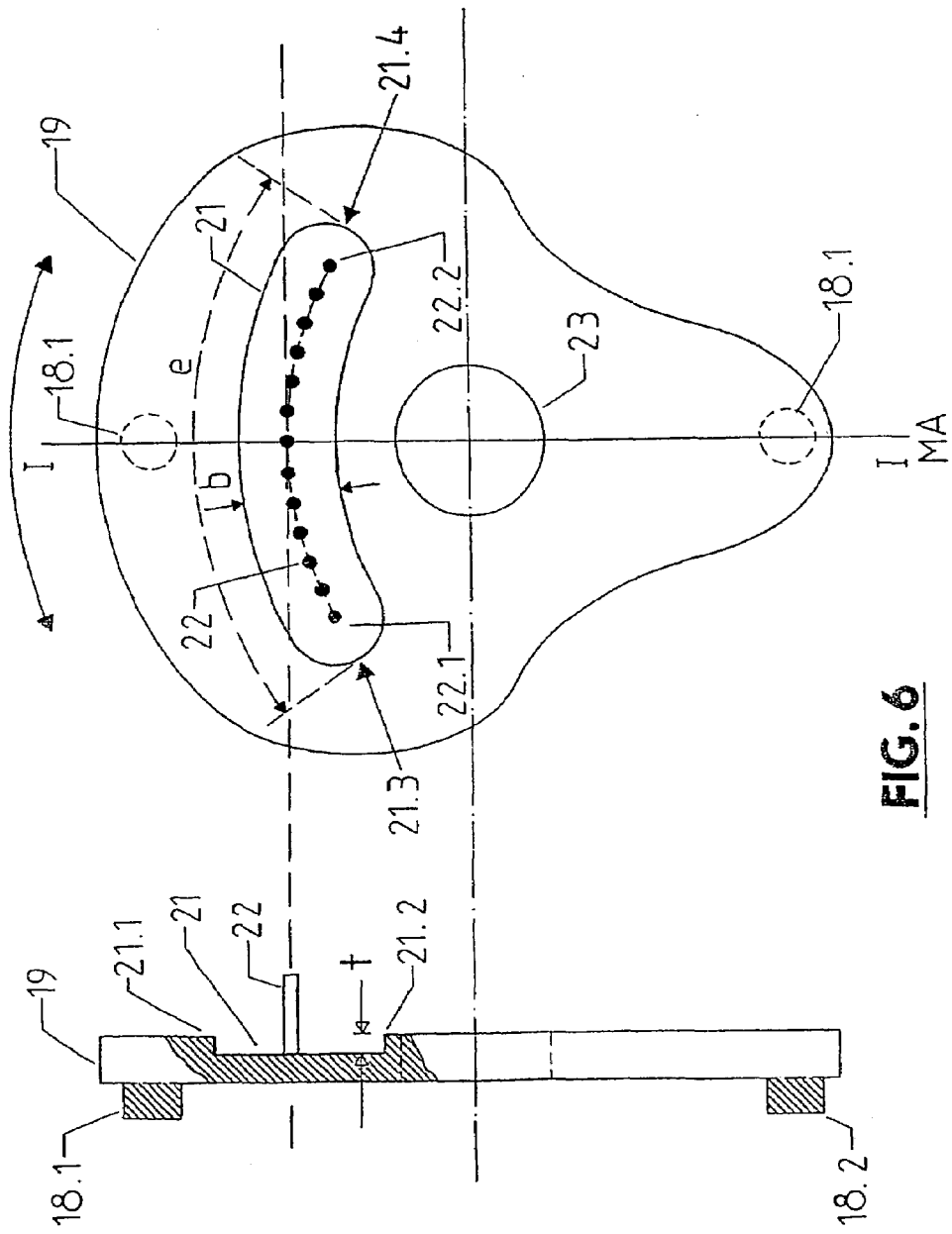
FIG. 6 shows a side view of the pendulum plate and a cross section through the pendulum plate along the line 1-1 and the middle axis MA.

The recess 21 comprises one upper and lower guide 21.1, 21.2, which merge into each other in a semicircle at the left and right ends or reversing points 21.3, 21.4. The left and right reversing points 21.3, 21.4 are therefore arranged in a semicircle around one first and second outer pilot pin 22.1, 22.2, and the first and second pilot pins 22.1, 22.2 and the additional pilot pins 22 are each at the same distance from the upper and lower guide 21.1, 22.2 of the recess 21, respectively, the distance corresponding for example to half the width b/2. In addition, the pendulum plate 19 comprises an opening 23 enclosing the spool axis SA, the middle point of which opening comes to lie on a symmetry axis MA of the pendulum plate 19 extending perpendicular to the spool axis SA and along which the first and second bearing elements 18.1, 18.2 are arranged. The first and second bearing elements 18.1, 18.2 stand out perpendicularly from the bottom surface of the pendulum plate 19 opposite the recess 21 and—as indicated in FIGS. 5 and 7—are guided in the two rectangular recesses 17.1, 17.2 of the spur gear 16, the ends of which are likewise semicircular.

A gear element 24 linked with the drive mechanism 5.3 of the spool 4, in particular by means of a pinion gear 5.4, engages by means of a bearing element 24.1 in the recesses 21 of the pendulum plate 19 and is guided between the pilot pins 22 and the upper or lower guide 21.1, 21.2 of the recess 21. Furthermore, the gear element 24 comprises one first gear 24.2 and one second gear 24.3, which are linked with each other by means of a connecting rod 25. The first gear 24.2 engages in the pilot rods 22 of the pendulum plate 19 and rolls off along the pilot pins 22 on the quarter-circular path defined by said pilot pins, during which the gear element 24 is guided for example by means of the bearing element 24.1 bearing on the upper or lower guide 22.1, 22.2. On the left or right outer pilot pin 22.1, 22.2 the gear element 24 follows the semicircular reversing points 21.3, 21.4 and thus describes a reversing movement in order to traverse the previously traveled segment of the circular path in the opposite direction. FIG. 9 shows by way of example the first gear 24.2 positioned within the left reversing point 21.3 and guided by the left outer pilot pin 22.1 during the reversing movement.

This movement of the first gear 24.2 of the gear element 24 circling the pilot pins 22, 22.1, 22.2 causes an oscillating back and forth movement of the pendulum plate 19 on the spool axis SA, which is transmitted via the first and second bearing element 18.1, 18.2 to the spur gear 16, which drives the pilot shaft 8 of the line guide 7 via the gear teeth 16.1. The rotary direction of the pilot shaft 8 therefore alternates with the alternation of the first gear 24.2 from the upper to the lower guide 21.1, 21.2 of the recess 21 of the pendulum plate 19 and vice versa. In this connection, the pitch of the pilot shaft 8, the number of the pilot pins and the transmission ratio between the spur gear 16 and the gear 15 are matched so that during winding or unwinding of the fishing line 3, the line guide 7 is moved back and forth evenly between the two housing sections 5.1, 5.2, parallel to the spool axis SA.

The semicircular design of the carriage guide 21 on the two ends results in a short standstill of the pilot shaft, thus achieving perfect guiding of the spool during winding of the line, so that even winding of the fishing line 3 is possible especially in the edge area.

The second gear 24.3 of the gear element 24 is linked by means of the pinion gear 5.4 with the drive mechanism 5.3 of the spool 5, by means of which the rotary movement generated by the crank 6 is converted into an oscillating back and forth movement of the line guide 7 or of its carriage element 9.

Furthermore, the drive mechanism 5.3 of the spool can be switched off by means of a switch element, for example a first push button or switch lever 26.1 provided on the side of the housing section 5.1, so that in the event of a break in the fishing line 3, the line guide 7 or the carriage element 9 and the winding of the fishing line 3 on the spool can be synchronized. For this purpose, the drive mechanism of the line guide 7 is uncoupled from the spool 4 by pushing the first push button or flipping the first switch lever 26.1 on the housing 5, i.e. the line guide 7 therefore remains in its current position. Now the broken line 3 can be threaded by the fisherman into the line eyelet 10 and the fishing line 3 can be wound off of the spool 4 by manually pulling the line until the position of the line guide 7 and the current winding position of the line 3 wound on the spool 4 match and therefore are synchronized with respect to the winding direction and winding position. After completing alignment of the line winding relative to the current position of the line guide 7, the first push button 26.1 is released or the first switch lever 26.1 is flipped again and the drive mechanism of the line guide 7 engages no later than the next time the crank 6 is turned. This makes it possible to easily synchronize a broken line 3 with the "parked" line guide 7, ensuring that the line 3 is wound tightly adjacent to the last winding on the spool 4 when winding is continued.

In this embodiment of the invention, a reel unit 2 with a reversing gear mechanism is provided in addition, thus making it possible to reverse the driving direction of the spool 4. To switch the direction of rotation of the spool, i.e. to switch the reversing gear mechanism, a second push button or switch lever 26.2 is provided on the housing 5. Especially when changing the reel unit 2 for switching from left-handed to right-handed operation and for mounting the reel unit 2 upright on the rod 1 or suspended from the rod 1, the use of a reversing gear mechanism eliminates the need for rewinding the line 3 on the spool 4.

In addition, for mounting the reel unit 2 on the rod 1, a moveable mounting device 27 is provided, which consists of one first and second prismatic guide 27.1, 27.2, offset by 180° on or between the two housing sections 5.1, 5.2, which are provided on the housing 5 or integrated in the housing 5, opposing each other on a parallel to the spool axis SA. Furthermore, the moveable mounting device 27 comprises a prismatic carriage element 28, which is connected by means of a bottom element 29 with a holding element 30 extending perpendicular to the longitudinal axis of the rod 1 when mounted. The holding element 30 and the bottom element 29 and prismatic carriage element 28 are perpendicular to each other. For mounting the reel unit 2, the prismatic carriage element 28 of the mounting device 27 is inserted into the first or second prismatic guide 27.1, 27.2 and fastened by means of a clamping screw 31 provided on the bottom element 29.

The moveable mounting device 27 and the reversing gear described above, and the line guide described above enable a "4 in ONE" operation of the reel unit 2, i.e. the reel unit 2 can easily and quickly be switched from left-handed to right-handed operation or suspended or upright-mounted operation. The reversing gear mechanism ensures that the rotary direction of the spool 4 remains the same, regardless of how the reel unit 2 is mounted on the rod 1. It is also possible to balance the reel unit 2 mounted on the rod 1 by moving the prismatic carriage element 28 of the mounting device 27 in the first or second prismatic guide 27.1, 27.2, which moves the reel unit 2 laterally relative to the rod 1.

The invention was described above based on an exemplary embodiment. It goes without saying that numerous modifications and variations are possible without abandoning the underlying inventive idea upon which the invention is based.

REFERENCE LIST

1 fishing rod
2 reel unit
3 fishing line
4 spool of the reel unit
5 spool housing
5.1 housing element
5.2 housing element
5.3 drive mechanism
5.4 pinion gear
6 crank
7 line guide
8 carriage guide or pilot shaft
9 carriage element
10 line eyelet
11 guide rail
12 internal thread
13 guide channel
14 bore hole
15 pilot gear
16 spur gear
16.1 drive gears
17.1 first recess
17.2 second recess
18.1 first bearing element
18.2 second bearing element
19 pendulum plate
20 bearing bore
21 recess
21.1 upper guide
21.2 lower guide
21.3 left reversing point of recess
21.4 right reversing point of recess
22.1 left outer pilot pin
22.2 right outer pilot pin
23 opening
24 gear element
24.1 bearing element
24.2 first gear
24.3 second gear
25 connecting rod
26.1 first switch lever or push button
26.2 second switch lever or push button
27 movable fastening device
27.1 first prismatic guide
27.2 second prismatic guide
28 prismatic carriage element
29 bottom element
30 holding element
31 clamping screw
SA spool axis
MA symmetry axis of the pendulum plate

What is claimed is:

1. A line guide for a reel unit for winding/unwinding a fishing line onto/from a spool provided on a housing of the reel unit, in which the line guide comprises a carriage guide and a carriage element with at least one line eyelet and the carriage guide is linked with a gear unit of the spool wherein the carriage guide is a spindle-shaped pilot shaft and the carriage element comprises a guide channel with internal threads for guiding on the spindle-shaped pilot shaft and wherein the drive mechanism of the line guide can be uncoupled from a drive mechanism of the spool by means of a switch element.

2. A line guide for a reel unit for winding/unwinding a fishing line onto/from a spool provided on a housing of the reel unit, in which the line guide comprises a carriage guide and a carriage element with at least one line eyelet and the carriage guide is linked with a gear unit of the spool wherein a drive mechanism of the line guide can be uncoupled from the drive mechanism of the spool by means of a switch element.

3. The line guide according to claim 2, wherein the carriage guide is a spindle-shaped pilot shaft and that the carriage element comprises a guide channel with internal threads for guiding on the spindle-shaped pilot shaft.

4. The line guide according to claim 3, wherein the carriage element further comprises, a bore hole, in which a guide rail is guided that is positioned parallel to the spindle-shaped pilot shaft.

5. The line guide according claim 4, wherein a longitudinal axis of the guide channel and of the bore hole are perpendicular to a longitudinal axis of the at least one line eyelet.

6. The line guide according claim 4, wherein a longitudinal axis of the guide channel or of the bore hole are perpendicular to a longitudinal axis of the at least one line eyelet.

7. The line guide according to claim 3, wherein the spindle-shaped pilot shaft is arranged parallel to a spool axis (SA) and between two housing sections of the housing of the reel unit.

8. The line guide according to claim 3, wherein the spindle-shaped pilot shaft is equipped with a pilot gear, which engages with a spur gear and that the spur gear is driven by a pendulum plate, which is linked with a drive mechanism by means of a gear element.

9. The line guide according to claim 8, wherein the spur gear has a circular disc shape and comprises several gear teeth, which engage with the pilot gear.

10. The line guide according to claim 8 wherein the spur gear comprises at least one recess, into which at least one bearing element standing out from a bottom surface of the pendulum plate engages.

11. The line guide according to claim 8, wherein the pendulum plate comprises a circular arc-shaped recess, in which the gear element is guided.

12. The line guide according to claim 11, wherein a plurality of pilot pins are arranged in that in the circular arc-shaped recess, the plurality of pilot pins stand out perpendicularly from a top surface of the pendulum plate and form a circular arc segment.

13. The line guide according to claim 12, wherein the plurality of pilot pins are arranged symmetrically to a symmetry axis (MA) of the pendulum plate in the recess.

14. The line guide according to claim 11 wherein the circular arc-shaped recess comprises one upper and one lower guide, which merge into each other in a shape of a circular arc at one left and one right outer reversing point.

15. The line guide according to claim 14, wherein the gear element comprises a bearing element, which is guided by means of the one upper or one lower guide.

16. The line guide according to claim 14, wherein the first gear of the gear element engages with the plurality of pilot pins of the pendulum plate and that a second gear can be functionally linked with a pinion gear of the drive mechanism of the spool.

17. The line guide according claim 14, wherein the pendulum plate executes an oscillating pendulum rotary movement for driving the spindle-shaped pilot shaft, the movement is converted by means of gear teeth provided on the spur gear and the pilot gear of the spindle-shaped pilot shaft engaging in the gear teeth into an oscillating rotary movement of the spindle-shaped pilot shaft.

18. The line guide according to claim 11, wherein above and below the circular arc-shaped recess along a symmetry axis (MA) of the pendulum plate, one first and one second bearing element are arranged, which stand out perpendicularly from a bottom surface of the pendulum plate.

19. A reel unit for a fishing line for use on a fishing rod, with a housing, a spool rotatably mounted on the housing that can be rotated via a gear unit by means of a hand crank for winding/unwinding the fishing line on the spool, the line guide can be uncoupled from the drive mechanism of the spool by means of a switch element.

20. The reel unit according to claim 19, wherein the gear unit of the spool is a reversing gear unit.

21. The reel unit according to claim 20, wherein the reversing gear unit can be switched by means of a switch element provided on the housing of the spool.

22. The reel unit according to claim 19, wherein a drive mechanism of the line guide can be switched on and off by means of a switch element provided on the housing of the spool.

23. The reel unit according to claim 19, wherein at least two opposing prismatic guides arranged parallel to a spool axis are provided on the housing and that, for mounting the reel unit on the fishing rod, a prismatic carriage element linked to the rod by means of a bottom element and a holding element engages in one of the at least two opposing prismatic guides.

24. The reel unit according to claim 23, wherein the position of the prismatic carriage element engaging in the respective prismatic guide and be variably adjusted so that the reel unit can be mounted on the fishing rod at different connecting points along the spool axis (SA).

* * * * *